(12) United States Patent
Lee et al.

(10) Patent No.: US 8,495,430 B2
(45) Date of Patent: *Jul. 23, 2013

(54) GENERATE DIAGNOSTIC DATA FOR OVERDUE THREAD IN A DATA PROCESSING SYSTEM

(75) Inventors: Van H. Lee, Cedar Park, TX (US); David D. Sanner, Rochester, MN (US); Thi N. Tran, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 13/044,640

(22) Filed: Mar. 10, 2011

(65) Prior Publication Data

US 2011/0161739 A1 Jun. 30, 2011

Related U.S. Application Data

(63) Continuation of application No. 12/235,031, filed on Sep. 22, 2008, now Pat. No. 7,958,402.

(51) Int. Cl.
*G06F 11/00* (2006.01)

(52) U.S. Cl.
USPC .......................................... 714/38.1

(58) Field of Classification Search
None
See application file for complete search history.

(56) References Cited

U.S. PATENT DOCUMENTS

| | | | |
|---|---|---|---|
| 6,587,967 B1 | 7/2003 | Bates et al. | |
| 6,594,774 B1 * | 7/2003 | Chapman et al. | ................. 714/2 |
| 6,954,922 B2 | 10/2005 | Liang | |
| 7,010,724 B1 | 3/2006 | Hicok | |
| 7,114,104 B1 | 9/2006 | Bennett | |
| 7,321,989 B2 | 1/2008 | Grayver | |
| 7,526,682 B1 | 4/2009 | Chacko et al. | |
| 7,802,257 B1 * | 9/2010 | Pariente | ........................ 718/104 |
| 7,814,486 B2 * | 10/2010 | Papakipos et al. | ............. 718/100 |
| 7,844,971 B2 * | 11/2010 | Ma et al. | ....................... 718/104 |
| 8,185,895 B2 * | 5/2012 | Ko et al. | ........................ 718/100 |
| 8,230,430 B2 * | 7/2012 | Accapadi et al. | ............. 718/103 |
| 2002/0059544 A1 | 5/2002 | Boucher et al. | |
| 2002/0162053 A1 | 10/2002 | Os | |
| 2004/0154020 A1 | 8/2004 | Chen et al. | |

(Continued)

OTHER PUBLICATIONS

McCarthy, Christopher S.; Notice of Allowance and Fee(s) Due; Jan. 25, 2011; U.S. Appl. No. 12/235,031; USPTO.

(Continued)

*Primary Examiner* — Christopher McCarthy (74) *Attorney, Agent, or Firm* — Libby Toub; Robert C. Rolnik (57) ABSTRACT

Disclosed is a computer implemented method, computer program product, and apparatus for generating diagnostic data for a thread. A service processor may begin by executing the computer usable program code to allocate a first thread to a monitoring function. The service processor determines if a second thread is running, wherein the second thread is associated with an operation. The service processor obtains an object pointer from a list of running threads, wherein the object pointer references a time data structure associated with the second thread, the time data structure comprising a maximum running time interval and a check time. The service processor calculates the check time as a maximum running time interval added to an initially sampled timestamp. The service processor determines if a current time exceeds the check time. In addition, the service processor generates an error log, responsive to a determination that the current time exceeds the check time.

7 Claims, 4 Drawing Sheets

U.S. PATENT DOCUMENTS

| | | | |
|---|---|---|---|
| 2005/0235136 A1 | 10/2005 | Barsotti et al. | |
| 2005/0251804 A1 | 11/2005 | Musta et al. | |
| 2006/0053422 A1 | 3/2006 | Alikacem et al. | |
| 2006/0248034 A1 | 11/2006 | Soderberg et al. | |
| 2007/0300230 A1 | 12/2007 | Barsness et al. | |
| 2008/0005332 A1 | 1/2008 | Pande et al. | |
| 2008/0104600 A1 | 5/2008 | May | |
| 2011/0010715 A1* | 1/2011 | Papakipos et al. | 718/100 |
| 2011/0055673 A1* | 3/2011 | Teng et al. | 715/200 |

OTHER PUBLICATIONS

McCarthy, Christopher S.; Office Action; Oct. 6, 2010; U.S. Appl. No. 12/235,031; USPTO.

Rajkumar Buyya; Multithreaded Programming Using Java Threads; Aug. 20, 2006; p. 48; Grid computing and Distributed Systems (GRID); http://www.cs.mu.oz.au/678/Threads.ppt.

Rolnik, Robert C.; Amendment to Office Action; Jan. 5, 2011; U.S. Appl. No. 12/235,031; USPTO.

* cited by examiner

GENERATE DIAGNOSTIC DATA FOR OVERDUE THREAD IN A DATA PROCESSING SYSTEM

This application is a continuation application of Ser. No. 12/235,031 filed Sep. 22, 2008.

BACKGROUND OF THE INVENTION

1. Field of the Invention

The present invention relates generally to a computer implemented method, data processing system, and computer program product for testing data processing systems. More specifically, the present invention relates to detect a thread lacking progress or otherwise hung and interrupting its progress to collect data concerning its state.

2. Description of the Related Art

Writers of modern software write software applications to perform tasks useful for people. The applications perform useful work based on a data processing system performing one or more operations or modules. Each module or operation is made up of a series of computer readable instructions. The instructions may be native to the hardware of a processor of the computer. In other words, native instructions or machine code, require no special interpretation by the processor, and simply run according the circuits of the processor. In addition, instructions may be according to an interpreted computer language. In this example, an instruction may correspond to one or more machine codes, and the processor may look up or otherwise obtain the machine codes that match a particular instruction, before actually executing the instruction. An operation is a sequence of instructions. The operation may be stored to disk or memory. When the operation is in memory, a processor may retrieve and perform individual instructions and keep state information during a time that the operation is active. At a time that the operation is active, a data processing system may assign to it a thread.

Multithreading processors perform processes. A process is the executing of one or more threads. A thread is a unit of execution within a process. A process may correspond to an operation. Accordingly, a thread may perform some or all instructions of an operation when the thread is dispatched to a processor.

Interdependencies between running threads can be a desired feature in a processing system. In other words, a thread may rely upon a system resource controlled by a second thread in order to continue operation. A system resource can be, for example, a lock, or an available memory, among others. Occasionally, two threads may both require a system resource and may compete to use the resource. This state can result in a deadlock, wherein one or more operations are unable to complete for the reason that the resource is occupied and not released. This situation is one among many reasons that an operation may make no progress and hang.

Many tests of a prototype hardware and/or software may be automated, and accordingly seek to minimize software engineer time during the collection of statistics of the functioning prototype hardware and/or software. Since some automated tests of prototype hardware and/or software rely on one or more operations completing in a reasonable amount of time, the testing can be delayed when an operation hangs indefinitely. Many tests that are scheduled to follow a hung impacted test can be blocked and remain uncompleted at a time a software engineer notices the situation.

SUMMARY OF THE INVENTION

The present invention provides a computer implemented method, computer program product, and apparatus for generating diagnostic data for a thread. A service processor may begin by executing the computer usable program code to allocate a first thread to a monitoring function. The service processor determines if a second thread is running, wherein the second thread is associated with an operation. The service processor obtains an object pointer from a list of running threads, wherein the object pointer references a time data structure associated with the second thread, the time data structure comprising a maximum running time interval and a check time. The service processor calculates the check time as a maximum running time interval added to an initially sampled timestamp. The service processor determines if a current time exceeds the check time. In addition, the service processor generates an error log, responsive to a determination that the current time exceeds the check time.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
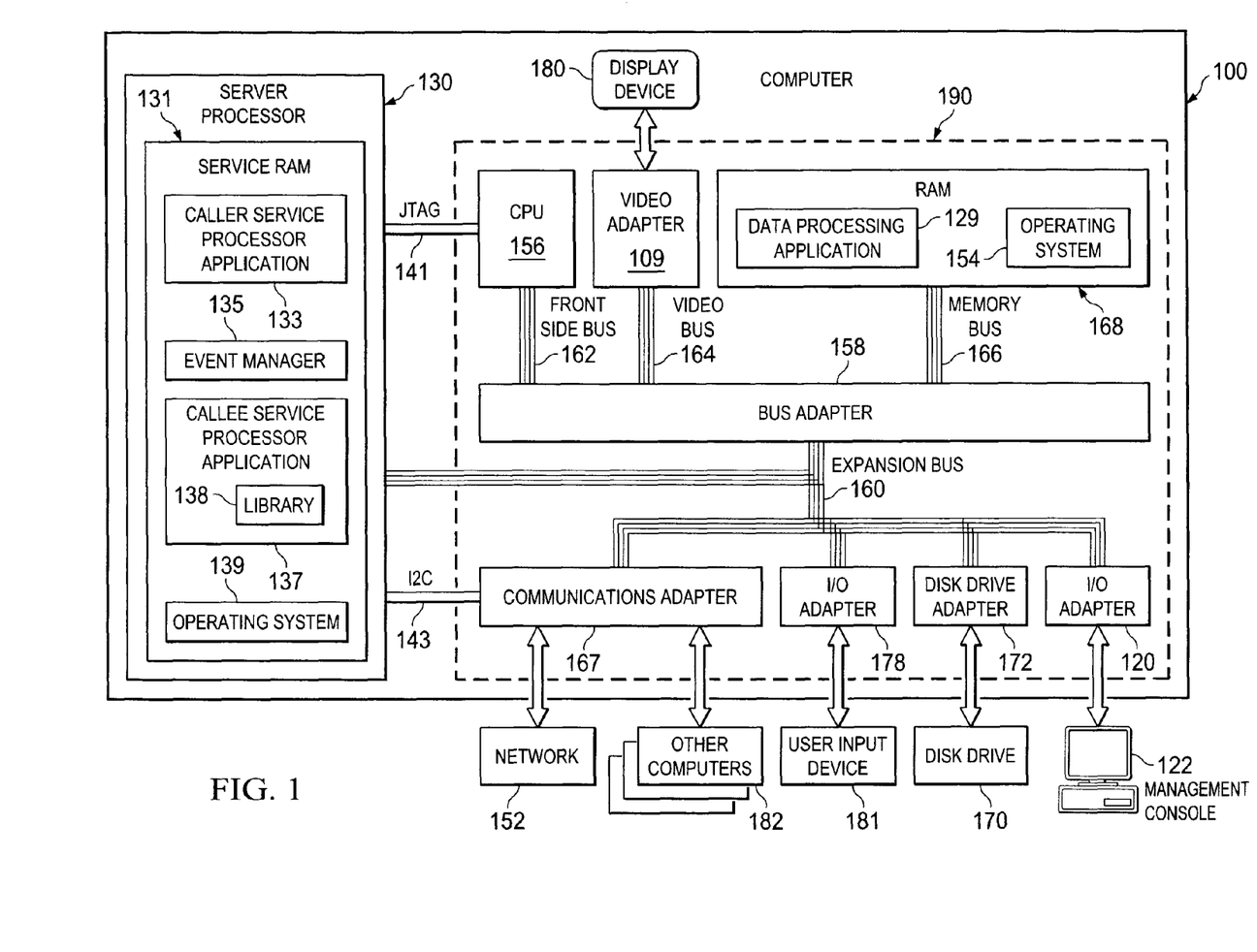
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. FIG. 1 is a block diagram of data processing system 100 configured to run operations and respond to hung operations according to embodiments of the present invention. Data processing system 100 of FIG. 1 includes at least one main computer processor or CPU 156 as well as random access memory (RAM) 168, which is connected through a high speed memory bus 166 and bus adapter 158 to processor 156.

Data processing system 100 of FIG. 1 includes at least one service processor 130, which is also connected through bus adapter 158 to processor 156 and to other components of the system. In this example, the service processor 130 is also connected to components of the data processing system 100 through a Joint Test Action Group (JTAG) connection 141 and an inter-integrated circuit (I2C) connection 143. Service processor 130 is a computer-within-a-computer. CPU 156 is the main processor upon which normal data processing programs are executed. Normal data processing programs may be, for example, server applications, word processing programs, web sites, spreadsheets, database managers, and the like. The CPU 156, combined with all components other than service processor 130, may be referred to as the Central Electronics Complex (CEC) server 190. In the example of FIG. 1, CEC server 190 is composed of CPU 156, video adapter 109, RAM 168, memory bus 166, bus adapter 158, video bus 164, front side bus 162, expansion bus 160, communications adapter 167, I/O adapter 178, disk drive adapter 172, and I/O adapter 120.

Service processor 130 operates independently of the CPU 156 and includes service RAM 131 and other components explained in more detail below. Service processor 130 is both the service processor hardware, one or more microprocessors, service RAM 131, which contains caller service processor application 133, event manager 135, callee service processor application 137, library 138, and operating system 139. The service processor 130 operates generally to provide the CEC server 190 with diagnostics, initialization services, configuration services, run-time error detection, and error correction. Service processor 130 controls the hardware of the CEC server 190, monitors and diagnoses the operational state of the CEC server 190 provides I/O functionality for management control through management console 122, and so on. Examples of services provided by service processor 130 for the CEC server 190 typically include: Power On Self Test (POST) and similar host diagnostics; environmental monitoring; and automated domain-shutdown in the event of an out-of-bounds condition, such as a CPU getting too hot. In addition, the service processor may assign multiple paths to I/O devices for increased availability; monitor and display host environmental statistics, such as the temperatures, currents, and voltages present on system boards. Furthermore, the service processor may monitor and control power flow to the CEC components, such as system boards and control boards; as well as log and notify for responses to various events in the CEC server.

Service processor 130 is connected through expansion bus 160 and I/O adapter 120 to management console 122. Management console 122 is operated by an operator as a specific terminal for issuing commands to the service processor 130 and for viewing status reports and event notifications from the service processor. The service processor 130 also may send status reports and event notifications to printers, disk files, or other I/O destinations.

Stored in RAM 168 is data processing application 129, a module of computer program instructions for carrying out user-level data processing. Examples of data processing applications include server applications, word processing programs, web sites, spreadsheets, database managers, and so on. Also stored in RAM 168 is operating system 154. Operating systems, useful in CEC complexes susceptible to running operations and responding to hung operations according to embodiments of the present invention, include Linux™, Microsoft XP™, AIX™, IBM's i5/OS™, and others as will occur to those of skill in the art. Linux is a trademark of Linus Torvalds. Microsoft XP is a trademark of Microsoft Corporation in the United States and/or other countries. AIX and i5/OS are trademarks of International Business Machines Corporation in the United States and/or other countries. Application 129 and operating system 154 in the example of FIG. 1 are shown in RAM 168, but many components of such software typically are stored in non-volatile memory also, such as, for example, in flash memory or on disk drive 170.

The data processing system 100 of FIG. 1 includes disk drive adapter 172 coupled through expansion bus 160 and bus adapter 158 to processor 156 and other components of data processing system 100. Disk drive adapter 172 connects non-volatile data storage to data processing system 100 in the form of disk drive 170. Disk drive adapters, useful in computers for running operations and responding to hung operations according to embodiments of the present invention, include Integrated Drive Electronics (IDE) adapters, Small Computer System Interface (SCSI) adapters, and others as will occur to those of skill in the art. Non-volatile computer memory also may be implemented as an optical disk drive, electrically erasable programmable read-only memory (so-called EEPROM or Flash memory), RAM drives, and so on, as will occur to those of skill in the art.

The example data processing system 100 of FIG. 1 includes one or more input/output (I/O) adapters, such as I/O adapter 178 and I/O adapter 120. I/O adapters implement user-oriented input/output through, for example, software drivers and computer hardware for controlling output to display devices such as computer display screens, as well as user input from user input devices 181 such as keyboards and mice. The example data processing system 100 can include video adapter 109, which is an example of an I/O adapter specially designed for graphic output to a display device such as display device 180 or a computer monitor. Video adapter 109 is connected to processor 156 through high speed video bus 164, bus adapter 158, and front side bus 162, which may be a high speed bus.

The exemplary data processing system 100 of FIG. 1 includes communications adapter 167 for data communications with other computers 182 and for data communications with network 152. Such data communications may be carried out serially through RS-232 connections, through external buses such as a Universal Serial Bus (USB), IP data communications networks, and in other ways as will occur to those of skill in the art. Communications adapters can implement the hardware level of data communications features through which one computer sends data communications to another computer, directly or through a data communications network. Examples of communications adapters useful in computers that support embodiments of the present invention include modems for wired dial-up communications, Ethernet (IEEE 802.3) adapters for wired data communications networks, and 802.11 adapters for wireless data communications network communications.

In the example of FIG. 1, disposed in service RAM 131 are caller service processor application 133, event manager 135, callee service processor application 137, library 138 of data processing functions, and operating system 139 for the service processor. In this example, caller service processor application 133, event manager 135, callee service processor application 137, library 138 of data processing functions, and operating system 139 for the service processor are all shown disposed in service RAM 131. It is appreciated that components of such software also may be stored in non-volatile memory, such as, for example, in Flash memory or on disk drive 170.

The caller service processor application 133, the callee service processor application 137, and event manager 135 are modules of computer program instructions that execute on service processor 130. The event manager is an object-oriented module that provides an interface through which service processor applications can subscribe to and monitor events on the service processor as well as events occurring on the CEC server 190. Library 138 contains data processing functions that carry out particular tasks of data processing. The library is compiled into the callee service processor application 137, exposing an application programming interface (API) of direct calls to computer software functions of the library. The direct calls have characteristic signatures, and the signatures include call parameters, such as, for example:

func1(parm1, parm2, . . .), where "func1(parm1, parm2, . . .)" is a signature for a call to a function named "func1" with call parameters named "parm1," "parm2," and so on.

Given this framework as illustrated in FIG. 1, service processor 130 in the example of FIG. 1 operates generally to use event manager 135 to effect a library function call from caller service processor application 133 to a function in library 138 of data processing functions in callee service processor application 137 by passing, by caller service processor application 133 to event manager 135 through the caller service processor application's API, an event representing the library function call. Further substeps to perform a function call may include passing, by event manager 135 to callee service processor application 137, an event representing the library function call; executing by callee service processor application 137 the library function call, including retrieving return data from the library function call. Accordingly, the callee service processor application 137 may return to event manager 135, an event representing the return data from the library function call. Likewise, the event manager 135 may return to caller service processor application 133, the event representing the return data from the library function call.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, although at least one illustrative embodiment runs on the service RAM 131 of the service processor, the illustrative embodiment can be performed by an application program running on the RAM 168 of the CEC server 190. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for having a service processor generate diagnostic data for an overdue thread. By performing a monitoring function, the service processor can periodically check each thread having a finite time for executing. If the thread is assigned a system time for completion that is in the past, but is still running, the service processor interrupts and terminates the thread, and generates an error log. An error log is a software data structure that contains diagnostic data collected by the service processor such as the application core dump, the debug traces of the various software components of the application, etc. The error log is stored in non-volatile memory, and subsequently retrieved for failure analysis.

Figure 2A:
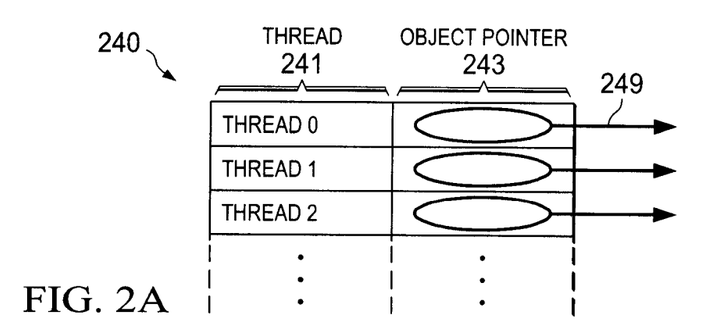
FIG. 2A shows a list of running threads in accordance with an illustrative embodiment of the invention.

FIG. 2A shows a list of running threads in accordance with an illustrative embodiment of the invention. The list of running threads is a data structure that matches an object pointer to a thread to which the object pointer is assigned. The threads can be identified by number up to a maximum allowable thread number of the thread pool implemented by the service processor application. The data structure can be list of running threads 240, made up of rows and columns. Each row has a field for the thread identity 241 and the object pointer 243. An object pointer is a pointer that references a data structure associated with an operation object whose actual execution is carried out by the thread. The operation object's data structure contains time data structures for keeping time values associated with the operation object. The object pointer is associated with an instantiation of an operation.

Figure 2B:
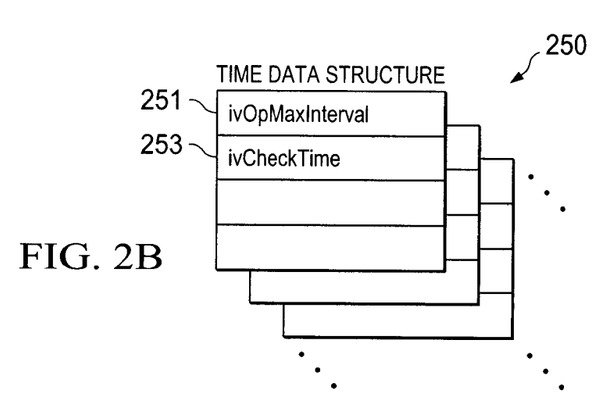
FIG. 2B is a time data structure in accordance with an illustrative embodiment of the invention.

FIG. 2B is a time data structure in accordance with an illustrative embodiment of the invention. A time data structure is a data structure having an entry comprised of a maximum running time interval and a check time associated with a thread or object pointer that references an entry in the data structure. The structure referenced by object pointer 249 of FIG. 2A can be time data structure 250. The time data structure may hold data stored in a system time format of the data processing system. For example, the time data structure may include a maximum running time interval 251 for an operation corresponding to the referencing object pointer. A software engineer may use a term ivOpMaxInterval as a variable name for the maximum running time interval. In addition, the time data structure may include check time 253. A maximum running time interval is a time interval that a thread may be permitted to run before a data processing system determines the thread to be hung.

When an application runs on a processor, the application may call upon an operation. At that time, the data processing system may instantiate an operation object with the desired maximum running time interval based on the type of the operation. For example, the monitoring function may run on a thread with its operation object having infinite maximum running time interval so that the monitoring function will never finish its task. In contrast, the operation to read a thermal sensor is performed within a finite time interval. Thus, the maximum running time interval of the operation object may be initialized to one second. A check time is either zero or a timestamp, as expressed in system time. The timestamp can be a system time when the thread is checked by the monitoring function. The check time may be zero if the monitoring function has not yet checked the thread according to the flowcharts of FIGS. 3A-3C. Check time 253 may be assigned a variable name, ivCheckTime, and is initialized to 0 when the operation object is instantiated. A monitoring function is a thread that may execute one or more of the steps described in connection with FIGS. 3A-3C, below.

Figure 3A:
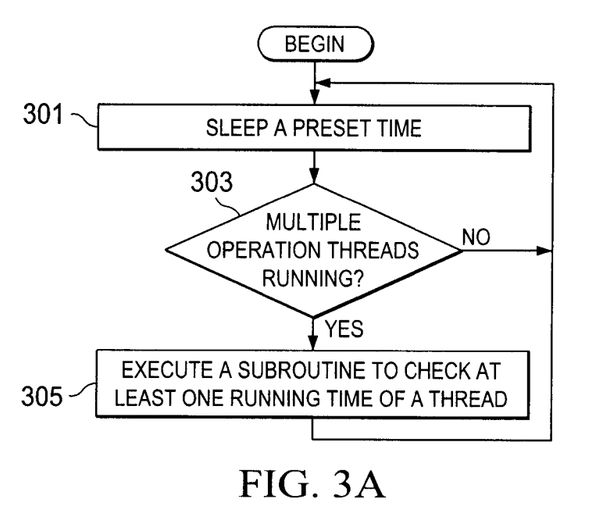
FIG. 3A is a flowchart of steps performed by a monitoring function on a service processor in accordance with an illustrative embodiment of the invention.

FIG. 3A is a flowchart of steps performed by a monitoring function on a service processor in accordance with an illustrative embodiment of the invention. The service processor can be, for example, service processor 130 of FIG. 1. Initially, the service processor may be dispatched to a thread to perform the monitoring function. Accordingly, the service processor may as a preliminary step, allocate a first thread to the monitoring function. Next, the service processor may cause the monitoring function to sleep a preset time (step 301). The preset time can be a range approximately 4 seconds to 8 seconds, as determined by the data collected from the actual workload condition of the service processor. The preset time can be chosen such that the monitor can be fairly sample the threads and does not use a disproportionate part of the CPU resources. A sleep duration is the time that the monitor thread is preempted by the operating system to give a virtual processing unit time slices to other active threads. The sleep duration may persist until the monitor thread of the monitoring function is woken up to resume its operation. Next, the service processor may determine if multiple operation threads are running (step 303). The service processor may do this step by counting the number of entries in the list of threads, for example, list of threads 240 of FIG. 2A.

A negative determination at step 303 may cause the monitoring function to repeat step 301. However, a positive determination at step 303 may cause the monitoring function to execute a subroutine to check at least one running time of a thread (step 305). The service processor may repeat step 301 in response to a completion of steps of the subroutine, as explained further below. More specifically, when an end or terminating event for the computer instructions embodying the steps in the flowchart of FIG. 3B complete, further processing at step 301 may occur with respect to the steps in the flowchart of FIG. 3A. The process of FIG. 3A may be executed continuously for as long as the data processing system functions normally.

Figure 3B:
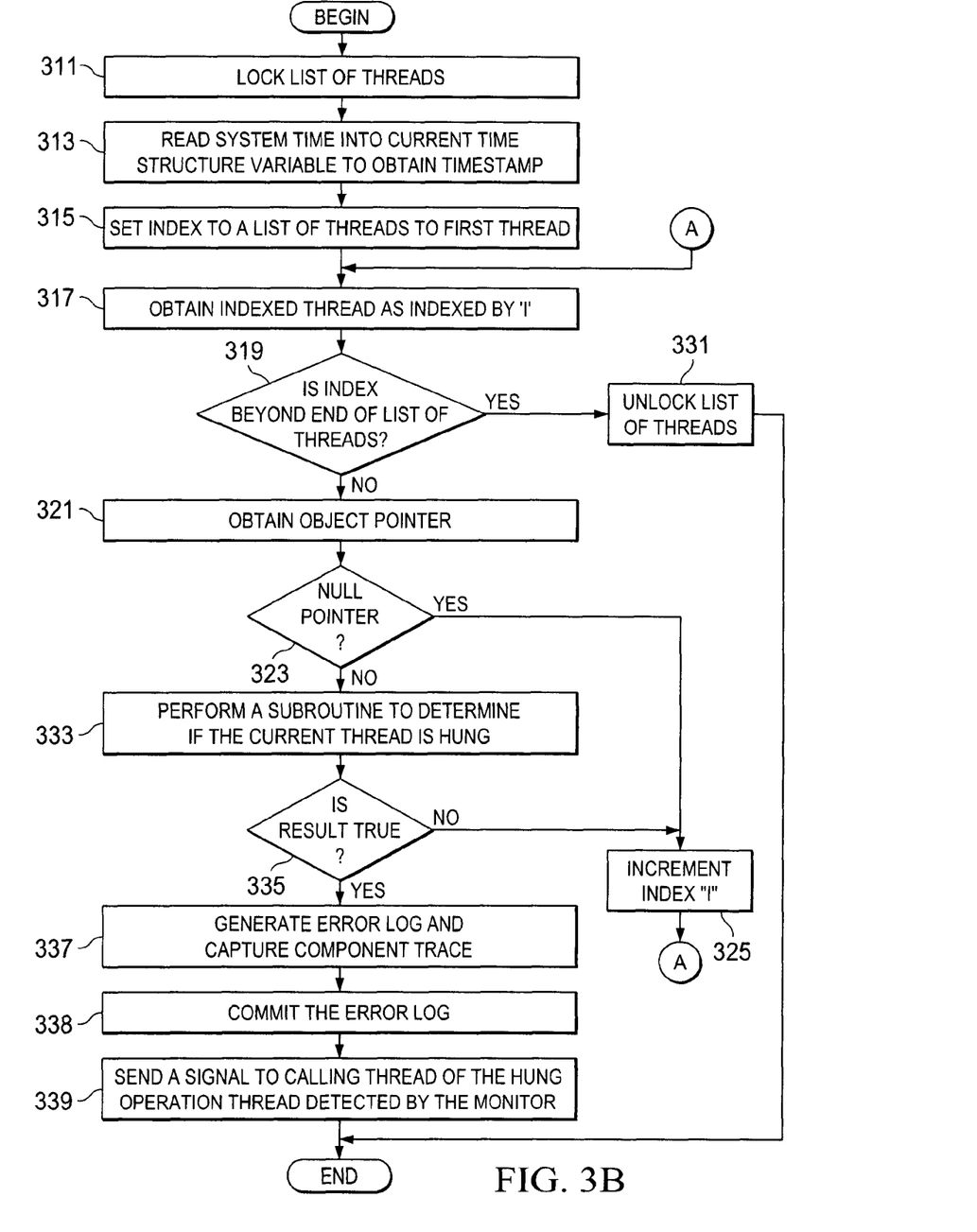
FIG. 3B shows a flowchart that may be steps continued by monitoring function of FIG. 3A in accordance with an illustrative embodiment of the invention.

FIG. 3B shows a flowchart that may be steps continued by monitoring function of FIG. 3A in accordance with an illustrative embodiment of the invention. Next, the service processor may lock a list of threads thread map access (step 311). Next, the service processor may read a system time into a current time structure variable to obtain a timestamp (step 313). The monitoring function may make a system call to the operating system to get the data processing system's current-time-of-day. The timestamp may be used to compare against the computed check times associated with each thread. Accordingly, upon a first execution of the non-sleeping steps of the flowcharts in FIGS. 3A-3B, with respect to a thread, the thread may receive an initially sampled timestamp into a check time of the corresponding time data structure for the thread. The initially sampled timestamp may be a timestamp sampled at step 313, and applied to a thread's time data structure in step 361 of FIG. 3C, below. Next, the service processor may set an index to the list of threads to a first thread (step 315). The service processor may use an index variable, 'I,' to traverse through the list of threads.

Next, the service processor may obtain the indexed thread as indexed by 'I' (step 317). Next, the service processor may determine if the index is beyond the end of the list of threads (step 319). If the index variable is beyond the end of the list of threads, the service processor may unlock access to the list of threads (step 331). Processing of the subroutine may terminate thereafter. Accordingly, control may resume at steps in FIG. 3A.

A negative result at step 319 may cause the service processor to obtain an object pointer associated with the thread indexed with the index variable (step 321). The object pointer may be, for example, for a hardware-object-model operation object corresponding to a hardware-object-model operation. A hardware-object-model operation is a set of instructions for a CEC server hardware object. The CEC server can include the server application of the service processor which is responsible to handle operations targeted to the hardware of the host system. A hardware-object-model operation may have a name or other identifier. Next, the service processor may determine if the thread is associated with a null pointer (step 323). A null pointer is a pointer that references a portion of memory accepted, by convention, to mean a null pointer. The memory can be a real address to 0x0000. A pointer set to a null pointer indicates that the thread has completed its operation, but the thread has not returned to the free thread pool. If the thread is associated with a null pointer, the service processor may increment the index I (step 325). The process repeats step 317 to obtain the next thread in the list of threads and begin new search for the object pointer.

If, however, at step 323 the service processor determines that the thread is associated with a pointer other than the null pointer, the service processor may perform a subroutine to determine if the current thread is hung (step 333). The current time may be passed to the subroutine by using the nomenclature "result=isHomOpThreadHung(I_cur)", where the subroutine name is "isHomOpThreadHung( )", and the current time is stored to a variable named "I_cur". The current thread can be the thread indexed by the index variable. The subroutine may have a function name such as, for example, isHomOpThreadHung. The value of the index variable may be further processed by the subroutine, as explained further in reference to FIG. 3C, below.

The subroutine, as processed by service processor, may return a value that corresponds with true or false. The value may be set to 1 if the result is true, and set to 0 if the result is false. Next, the service processor determines if the result of the subroutine performed in step 335 is true. If true, the service processor generates an error log and captures component traces (step 337). The error log and component traces correspond to a state of the thread currently indexed by the index variable. Next, the service processor may commit the error log or logs (step 338). In addition, the service processor may send a signal to a calling thread of the hung operation thread detected by the monitor (step 339). The calling thread's signal handler catches the signal, terminates its process, and generates the process's application core dump. Processing may terminate for the subroutine, but continue as described in step 301 in FIG. 3A, above.

Figure 3C:
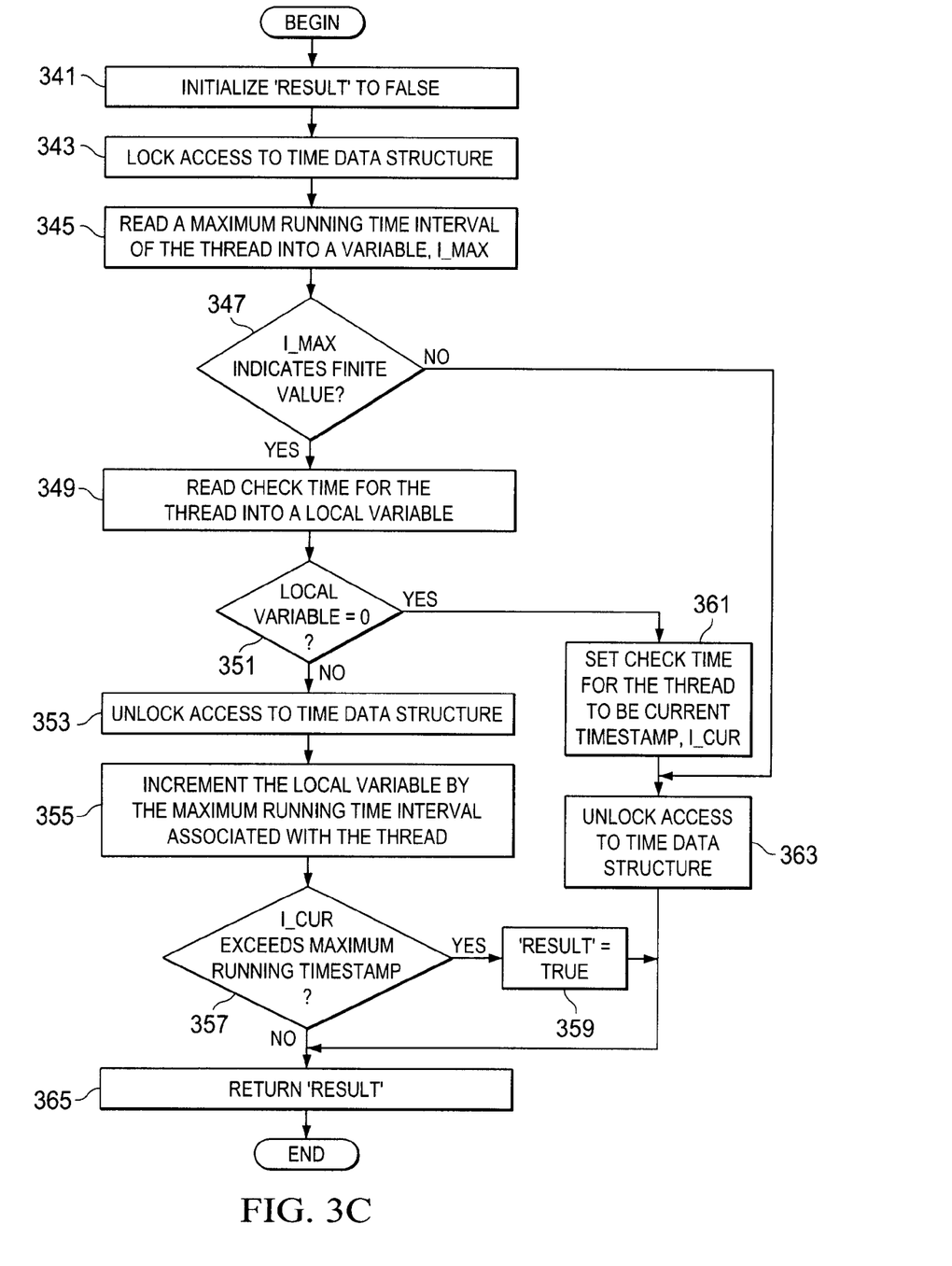
FIG. 3C is a flowchart of substeps of a subroutine called from the flowchart of FIG. 3B in accordance with an illustrative embodiment of the invention.

FIG. 3C is a flowchart of substeps of a subroutine called from the flowchart of FIG. 3B in accordance with an illustrative embodiment of the invention. The service processor may initialize a result variable to false (step 341). Next, the service processor may lock access to a time data structure (step 343). The time data structure corresponds to the object pointer obtained based on the index variable referencing a current entry in the list of threads. The time data structure can be, for example, time data structure 250 of FIG. 2B. Next, the service processor may read a maximum running time interval of the thread into a variable, I_max (step 345). Next, the service processor may determine if the I_max indicates a finite value (step 347).

An infinite value, or negative result to step 347, causes the service processor to unlock access to the time data structure (step 363). Alternatively, a positive result to step 347 may cause service processor to read the check time for the thread into a local variable (step 349). The local variable may be called I_check, and is local to the scope of the subroutine of FIG. 3C. Next, the service processor may determine if the local variable is zero (step 351). A negative result to step 351 may cause the service processor to unlock access to the time data structure (step 353). Next, the service processor may increment the local variable by the maximum running time interval associated (i_max) with the thread (step 355). Now, the local variable stores the maximum running timestamp. A maximum running timestamp is the threshold that the system timestamp exceeds when the thread is overdue.

Next, the service processor determines if the current timestamp (I_cur) exceeds the maximum running timestamp (step 357). If so, the service processor sets a result to true (step 359). A negative outcome may leave the result in the false state, as set at step 341. Accordingly, a negative determination at step 357, as well as completion of steps 363 and 359 may cause the service processor to return the result (step 365). Processing may complete for FIG. 3C and return the result as described in relation to step 333 of FIG. 3B, above.

For a first pass through the flowchart, a given thread may be unchecked previously. Accordingly, the check time may be uninitialized or set to zero. Accordingly, a positive result at step 351 may cause the service processor to set the check time for the thread to be the current timestamp (I_cur) (step 361). Next, the service processor may unlock access to the time data structure (step 363). The service processor may next return the result (step 365).

It is appreciated that illustrative embodiments of the invention may be implemented such that the service processor may execute the two or more subroutines of FIGS. 3A-3C as fewer or more subroutines and achieve the same effect. Accordingly, the scope of the invention includes such illustrative embodiments. In addition, the data structure forming the list of threads can be implemented as a linked list, binary tree, array, among other forms, to couple a thread with an object pointer.

The illustrative embodiments permit a service processor to measure periodically a thread's progress against an established deadline for completion or check time. If the current time available from a timestamp of the system indicates that the check time has expired for a thread, the service processor can collect data concerning the thread by, for example, generating an error log. Accordingly, software engineers may not be required to intervene when a process and/or a supporting thread hangs.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to generate diagnostic data for a thread, the method comprising:
    allocating a first thread to a monitoring function;
    determining if a second thread is running, wherein the second thread is associated with a first operation wherein the first operation is a hardware-object-model operation;
    obtaining a first object pointer from a list of running threads, wherein the first object pointer references a first time data structure associated with the second thread, the first time data structure comprising a first maximum running time interval and a first check time;
    responsive to obtaining the first object pointer, determining whether the first maximum running time interval is finite;
    responsive to a determination that the first maximum running time interval is finite, calculating the first check time as the first maximum running time interval added to an initially sampled timestamp;
    determining if a first current time exceeds the first check time;
    responsive to a determination that the first current time exceeds the first check time, generating an error log;
    determining if a third thread is running, wherein the third thread is associated with a second operation;
    obtaining a second object pointer from the list of running threads, wherein the second object pointer references a second time data structure associated with the third thread, the second time data structure comprising a second maximum running time interval and a second check time;
    calculating the second check time as the second maximum running time interval added to the initially sampled timestamp;
    determining if a second current time exceeds the second check time; and
    responsive to a determination that the second current time exceeds the second check time, generating the error log.

2. The computer implemented method of claim 1, further comprising: obtaining the initially sampled timestamp.

3. A computer program product for generating diagnostic data for a thread, the computer program product comprising: a tangible storage device having computer usable program code embodied therewith, the computer program product comprising:
    computer usable program code configured to allocate a first thread to a monitoring function;
    computer usable program code configured to determine if a second thread is running, wherein the second thread is associated with a first operation, wherein the first operation is a hardware-object-model operation;
    computer usable program code configured to obtain a first object pointer from a list of running threads, wherein the first object pointer references a first time data structure associated with the second thread, the first time data structure comprising a first maximum running time interval and a first check time;
    computer usable program code configured to determine whether the first maximum running time interval is finite, responsive to obtaining the first object pointer;
    computer usable program code configured to calculate the first check time as the first maximum running time interval added to an initially sampled timestamp, responsive to a determination that the first maximum running time interval is finite;
    computer usable program code configured to determine if a first current time exceeds the first check time;
    computer usable program code configured to generate an error log, responsive to a determination that the first current time exceeds the first check time;
    computer usable program code configured to determine if a third thread is running, wherein the third thread is associated with a second operation;

computer usable program code configured to obtain a second object pointer from the list of running threads, wherein the second object pointer references a second time data structure associated with the third thread, the second time data structure comprising a second maximum running time interval and a second check time;

computer usable program code configured to calculate the second check time as the second maximum running time interval added to the initially sampled timestamp;

computer usable program code configured to determine if a second current time exceeds the second check time; and computer usable program code configured to generate the error log, responsive to a determination that the second current time exceeds the second check time.

4. The computer program product of claim 3, further comprising: computer usable program code configured to obtain the initially sampled timestamp.

5. A data processing system for generating diagnostic data for a thread, the data processing system comprising:
a bus;
a storage device connected to the bus, wherein computer usable code is located in the storage device;
a communication unit connected to the bus; and
a processing unit connected to the bus, wherein the processing unit executes the computer usable program code to allocate a first thread to a monitoring function; determine if a second thread is running, wherein the second thread is associated with a first operation, wherein the first operation is a hardware-object-model operation; obtain a first object pointer from a list of running threads, wherein the first object pointer references a first time data structure associated with the second thread, the first time data structure comprising a first maximum running time interval and a first check time; determine whether the first maximum running time interval is finite, responsive to obtaining the first object pointer, responsive to a determination that the first maximum running time interval is finite; calculate the first check time as the first maximum running time interval added to an initially sampled timestamp; determine if a first current time exceeds the first check time; generate an error log, responsive to a determination that the first current time exceeds the first check time; determine if a third thread is running, wherein the third thread is associated with a second operation; obtain a second object pointer from the list of running threads, wherein the second object pointer references a second time data structure associated with the third thread, the second time data structure comprising a second maximum running time interval and a second check time; calculate the second check time as the second maximum running time interval added to the initially sampled timestamp; and determine if a second current time exceeds the second check time; and generate the error log, responsive to a determination that the second current time exceeds the second check time.

6. The data processing system of claim 5, wherein the processing unit further executes computer usable code to obtain the initially sampled timestamp.

7. The data processing system of claim 5, wherein the processing unit further executes computer usable code to send a signal to a calling thread to continue, responsive to a determination that the current time exceeds the check time.

* * * * *